United States Patent [19]

Gottschalk

[11] Patent Number: 4,981,502

[45] Date of Patent: Jan. 1, 1991

[54] OIL-AIR SEPARATOR

[75] Inventor: Alfred Gottschalk, Indersdorf, Fed. Rep. of Germany

[73] Assignee: MTU Motoren -Und Turbinen-Union, Munich, Fed. Rep. of Germany

[21] Appl. No.: 266,164

[22] Filed: Nov. 2, 1988

[30] Foreign Application Priority Data

Nov. 3, 1987 [DE] Fed. Rep. of Germany ....... 3737221

[51] Int. Cl.$^5$ .............................................. B01D 45/14
[52] U.S. Cl. ...................................... 55/400; 55/406; 55/438
[58] Field of Search ................. 55/203, 400, 402, 405, 55/406, 438

[56] References Cited

U.S. PATENT DOCUMENTS

| 881,723 | 3/1908 | Scheibe | 55/400 |
| 3,343,342 | 9/1967 | Du Rocher | 55/467 |
| 3,859,063 | 1/1975 | Porter et al. | 55/337 |
| 4,627,861 | 12/1986 | Ibaraki et al. | 55/473 |

FOREIGN PATENT DOCUMENTS

| 3137947 | 11/1983 | Fed. Rep. of Germany . | |
| 774610 | 10/1980 | U.S.S.R. | 55/406 |
| 822907 | 4/1981 | U.S.S.R. | 55/400 |
| 975038 | 11/1982 | U.S.S.R. | 55/400 |
| 1263313 | 10/1986 | U.S.S.R. | 55/400 |
| 1408195 | 10/1975 | United Kingdom . | |
| 1508212 | 4/1978 | United Kingdom . | |

Primary Examiner—Jay H. Woo
Assistant Examiner—C. Scott Bushey
Attorney, Agent, or Firm—Ladas & Parry

[57] ABSTRACT

An oil-air separator having feed blades secured for rotation with a hollow rotor mounted for rotation in a stator housing with the formation of an annular space therebetween. The stator housing has an inlet for an oil-air mixture and an outlet for oil which is separated from the mixture. The feed blades are adapted to suit the contour of the annular space and ensure good separation of the air from the oil while achieving a high outlet oil pressure. The air which is separated from the oil-air mixture flows through a porous layer on the hollow rotor into the hollow rotor for external discharge therefrom.

8 Claims, 2 Drawing Sheets

OIL-AIR SEPARATOR

FIELD OF THE INVENTION

The invention relates to an oil-air separator comprising a hollow rotor supported for rotation within a stator housing to define an annular space therebetween, the housing having an inlet for oil-air mixture which flows to the annular space where separation of oil and air takes place and the separated oil flows outwardly from the housing through an outlet therefor while the separated air passes through holes in the rotor into the interior of the rotor for external discharge.

DESCRIPTION OF PRIOR ART

Oil-air separators of the above type are employed in a closed-circuit oil system to eliminate air from the circuit that was picked up mainly at the lubricating points.

U.S. Pat. No. 3,859,063 shows an oil-air separator which uses blades to fling the incoming oil-air mixture against an annular wall. In the process, the oil forms a layer that is transported to an oil outlet port. Either the oil outlet port or the pipes connected to it are dimensioned to produce a certain amount of stagnation and thereby induce a steady, bubble-free outlet flow of oil. Due to the delivery action of the blades, the air pressure in the annular space bounded by the annular wall is raised.

The air is removed through radially inwardly arranged ports. In the process, splashing oil and oil mist generated in the process are disadvantageously entrained in the air stream and thus considerably impair the degree of separation.

GB-PS No. 1,508,212 discloses an oil-air separator in which a porous, rotating cylindrical body is permeated by the oil-air mixture. This process, however, does not achieve clear separation between the oil and air discharge routes, causing oil particles to be entrained in the air stream. Another disadvantage is that as the oil enters the porous layer, high pressure losses are produced in the oil-air separator. The oil spun off the porous layer is caused to rotate solely by rotor friction. Accordingly, no forced transportation of the oil exists, and the oil is not rotated sufficiently to generate a high pressure level at the oil outlet port.

DE-PS No. 31 37 947 shows an arrangement of similar design, which is subject to the same disadvantages.

SUMMARY OF THE INVENTION

An object of the present invention is to provide an improved oil-air separator in which the separation capacity is increased while a high oil pressure is achieved at the outlet end.

In accordance with the invention, a plurality of radial feed blades are attached to the rotor and extend in the annular space between the stator housing and the rotor such that the outer edges of the feed blades are spaced uniformly from the stator housing, the stator housing and edges of the blades flaring conically in a direction from the inlet for oil-air mixture and the outlet for separated oil.

In this arrangement, the oil stream is accelerated by the blades throughout its entire passage through the annular space. By arranging the inlet and outlet ports at separate ends of the axial annular space, a long distance for acceleration is obtained. Also, the permanent radial acceleration by the feed blades causes the oil stream to flow along the outer wall of the annular space preventing larger amounts of oil from penetrating radially inward into a porous layer on the rotor which surrounds the air outlets in the rotor. Continuous transportation by the feed blades along the annular space prevents the formation of many oil splashes.

At the oil outlet port, the energy of acceleration imparted to the oil stream in its travel through the annular space produces a high static pressure, which alleviates the risk of fouling, provides safe feeding action, and provides sufficient pressure for enerizing downstream oil coolers or hydraulic pumps. This especially assists the operation of aircraft engines, since it generates sufficient delivery pressure in all aircraft altitudes.

In the preferred aspect of the present invention, the conical flare of the outer wall of the annular space provides an additional boost in the pressure increase generated by the feed blades.

In a further advantageous aspect of the present invention, a shroud is secured to the feed blades at the edges thereof for rotation with the feed blades. This also advantageously increases the pressure and helps prevent oil splashes, since the oil film can be transported along the inner surface of the rotating shroud. This also reduces the power required to drive the rotor, since the friction of the rotating oil on the stationary outer housing is eliminated.

According to a further aspect of the present invention, the oil inlet port is formed as an annular slot between the rotor and the stator housing, and an annular area is provided radially within the feed blades axially downstream from the oil inlet port. This serves to achieve a negative pressure in this area to aid in the induction of the oil-air mixture into the separator.

BRIEF DESCRIPTION OF THE FIGURES OF THE DRAWING

The invention is described more fully with reference to the accompanying drawing in which.

DETAILED DESCRIPTION OF PREFERRED EMBODIMENTS

Figure 1:
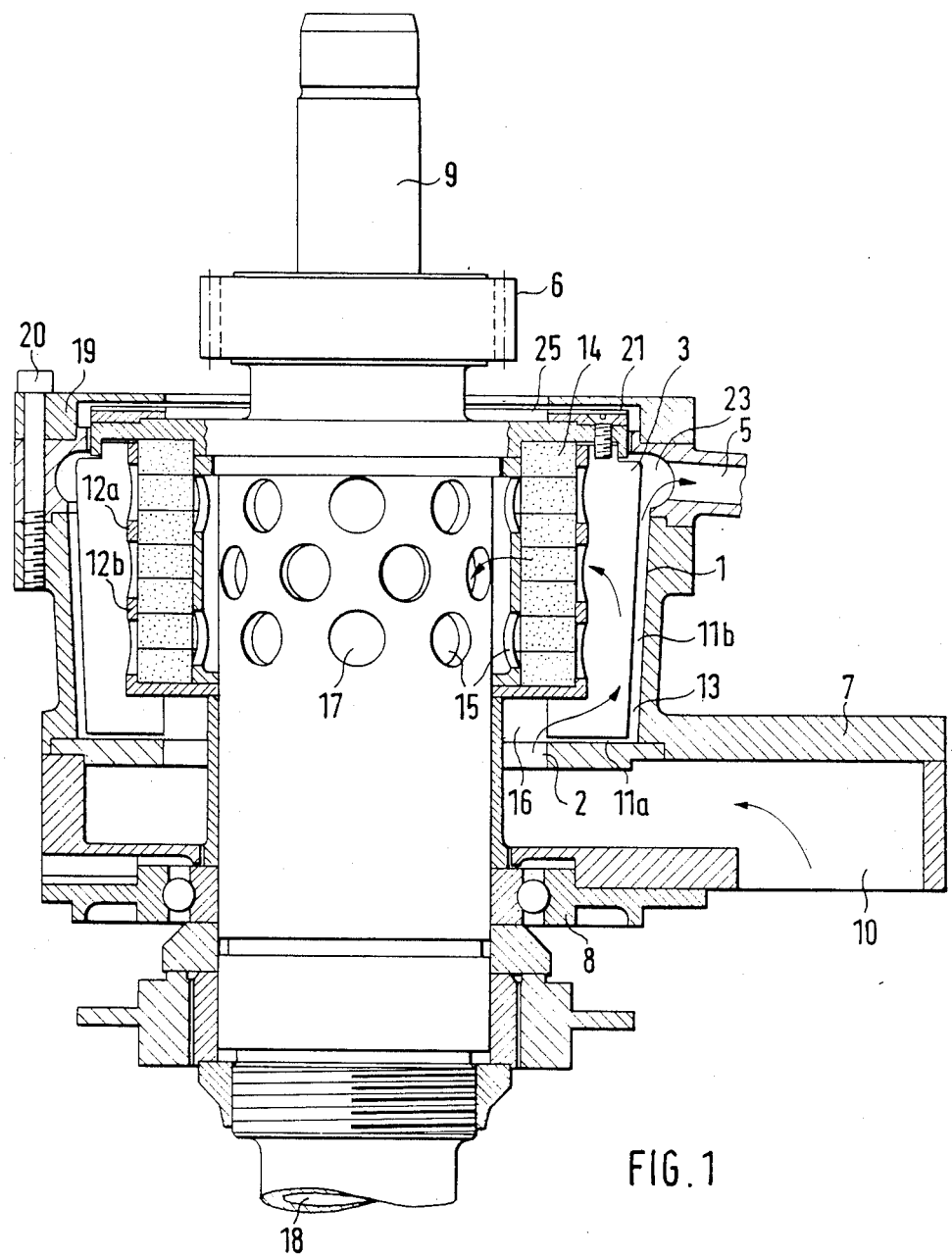
FIG. 1 is an elevational view, partly in section, of one embodiment of an oil-air separator according to the invention.

With reference now to FIG. 1, therein is seen an oil-air separator in accordance with the present invention essentially comprising a rotor 9 rotatably carried in a stator housing 7 by bearings of which bearing 8 is illustrated whereas a second bearing is not. For driving the rotor 9, a gear 6 thereon is connected to a driving means (not shown).

An oil-air mixture to be separated into oil and air components enters through an inlet duct 10 and reaches an area 16 via an inlet port 2 in the form of an annular slot in the stator housing 7. Due to generation of a negative pressure in area 16, the oil-air mixture flows to radial feed blades 3, which are secured to rotor 9 uniformly in circumferentially spaced relation. The number of blades on the rotor is at least two, will typically be between 6 and 2 but is not limited to a maximum number. The number of blades 3 on the rotor is a function of the viscosity of the oil and its concentration in the oil-air mixture, and the rotary speed of the rotor which can vary between 2000 and 30,000 rpm. The oil-air mixture travels radially outwards from area 16 through the blades 3 whereafter the mixture travels axially of the blades in a direction towards an oil outlet port 5.

The blades 3 are accomodated in an annular space 13 formed between the rotor 9 and the stator housing 7. The blades are adjusted in radial and axial position to provide blade clearances 11a and 11b between the blades 3 and the walls of the stator housing bounding the annular space 13. The blade clearance 11b at the outer wall 1 of the annular space 13 is greater than the axial blade clearance 11a. The oil is accelerated by the feed blades 3 and flung radially outwards against the outer wall 1 of the annular space 13, and the oil then flows towards the oil outlet port 5 along the outer wall 1. The wall 1 flares conically in the downstream direction of flow of the oil (upwards in FIG. 1).

At the downstream end of the annular space 13, an oil chamber 23 is provided in the housing 7 to collect the incoming stream of oil and direct the oil to the oil outlet port 5. In operation, stagnation in the oil discharge pipes (not shown) connected to outlet port 5 keeps the oil chamber 23 partially filled with oil.

The pumping action of the feed blades 3 also raises the air pressure in the annular space 13, causing the air to be pumped between retaining rings 12a, 12b radially inward into a cylindrical porous layer 14 on the rotor 9.

The rotor 9 is hollow and the air flows through the porous layer 14 further inwards through radial holes 15 in the rotor 9 and into a chamber 17 in the interior of the hollow rotor 9. The air is finally fed to an air outlet 18 and then to air discharge lines (not shown).

To prevent leakage flow between the rotor 9 and an axial cover plate 19, circumferentially spaced radial blades 21 are provided at the face side of the rotor 9 to transport leaked oil back into the annular space. The cover plate 19 is attached to the housing 7 by bolts 23.

Figure 2:
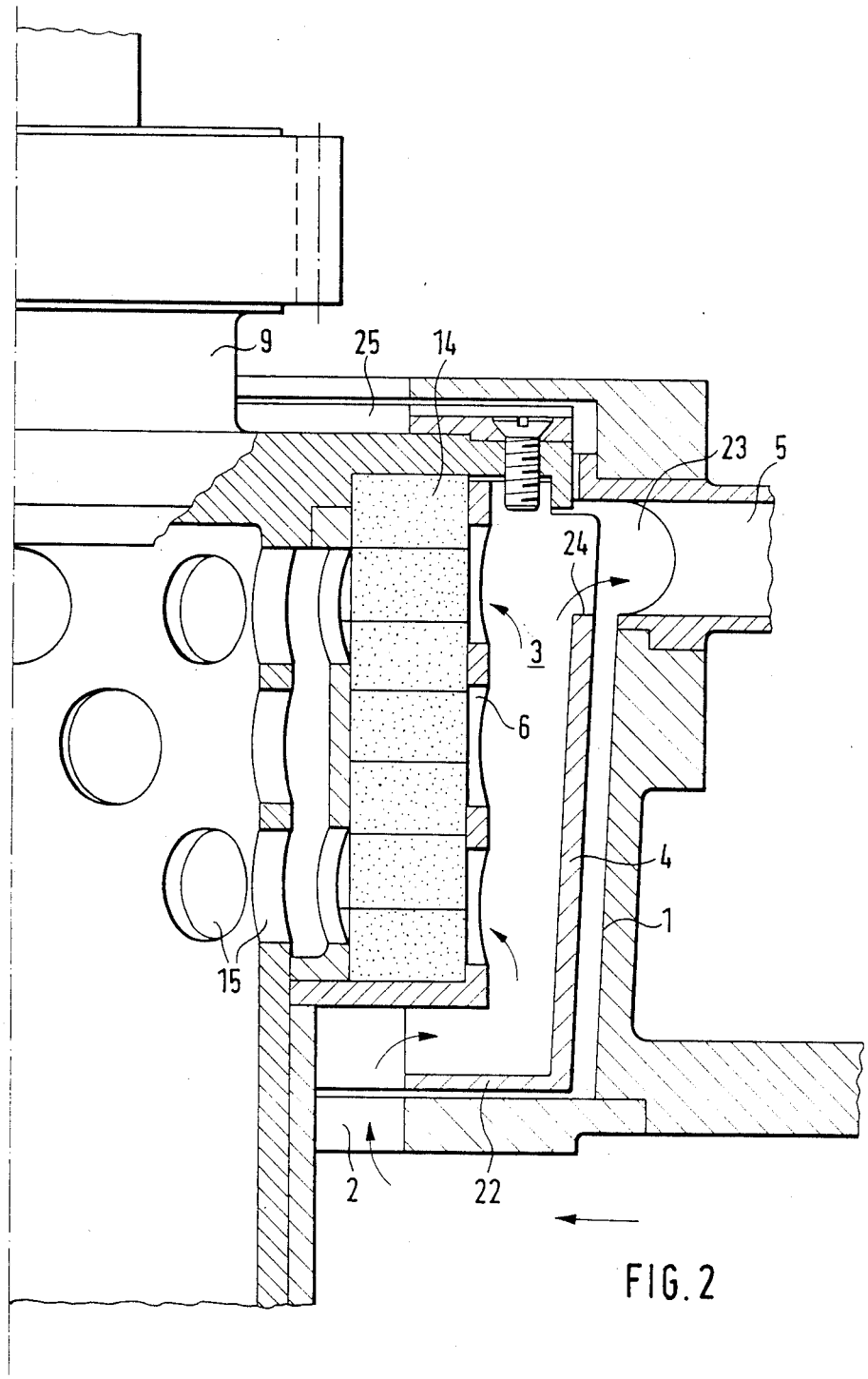
FIG. 2 is an elevational view on enlarged scale showing an alternative embodiment of the oil-air separator.

FIG. 2 shows an alternative embodiment of the present invention in which the feed blades 3 are surrounded by a conical shroud 4 at their circumference and at their forward axial end 22. In operation, a centrifugally accelerated film of oil hugs the inner wall of the shroud 4. The shroud terminates at the level of the oil outlet port 5, which cooperates with the oil collected in oil chamber 23 and which undergoes rotation therein. The oil delivered at this point from the shroud spills over the edge 24 of the shroud 4 and flows into the oil contained in oil chamber 23 wherefrom the oil flows to the oil outlet port 5. This embodiment also raises the pressure, alleviates oil splashing and reduces the power input requirement of the oil-air separator.

Although the invention has been described in relation to a specific number of embodiments thereof, it will become apparent to those skilled in the art that numerous modifications and variations can be made within the scope and spirit of the invention as defined in the attached claims.

What is claimed is:

1. An oil-air separator comprising a stator housing, a rotor rotatably carried in said stator housing, said stator housing having an inlet for an oil-air mixture, said rotor being hollow and provided with ports for passage into the rotor of air separated from the oil-air mixture, said housing having an outlet for oil separated from the oil-air mixture, said rotor and said stator housing defining an annular space therebetween which communicates with said inlet, with said ports, and with said outlet, a plurality of radial feed blades attached to the rotor, said feed blades having outer radial edges which are spaced uniformly from said stator housing, said outlet being located above said inlet, said stator housing and said edges of the blades flaring conically in a direction from said inlet to said outlet such that oil separated from said mixture travels upwardly along the conically flaring housing to said outlet, and a filter section on said rotor in communication with said annular space such that air separated from the oil-air mixture flows through said filter section before reaching said ports and entering the interior of the rotor, said housing defining a chamber upstream of said annular space, said inlet for oil-air mixture communicating with said chamber for admitting said mixture therein, said housing having a port through which the oilair mixture flows from said chamber to said annular space,
   said port being an annular slot in said housing below and radially inwards of said blades and communicating with a space in said housing in which negative pressure is developed by said blades upon rotation thereof so that the oil-air mixture introduced into said chamber flows through said port then radially outwards between said blades and thereafter axially in said annular space towards said outlet.

2. An oil-air separator as claimed in claim 1 wherein said radial blades are uniformly spaced around said rotor.

3. An oil-air separator as claimed in claim 1 comprising a conical shroud mounted on said feed blades to encircle the same.

4. An oil-air separator as claimed in claim 1 wherein said housing extends axially beyond said rotor to form a radial clearance therewith beyond said outlet, said rotor including a plurality of circumferentially spaced radial blades in said clearance.

5. An oil-air separator as claimed in claim 1 wherein said inlet in said stator housing is located radially outwards of said port in said stator housing to cause the oil-air mixture to flow radially inwards in said chamber and then through said port to said annular chamber.

6. An oil-air separator as claimed in claim 5 wherein said rotor is upright and said oil outlet is located at the top of said annular chamber.

7. An oil-air separator as claimed in claim 6 wherein the flaring surface of the housing and the edges of the blades widen upwardly.

8. An oil-air separator as claimed in claim 3 wherein said conical shroud has an opening at the level of said oil outlet, said opening defining an edge over which separated oil flows to said outlet.

* * * * *